United States Patent
Stausgaard (10) Patent No.: US 9,657,711 B2
(45) Date of Patent: May 23, 2017

(54) UNDERGROUND WATERMILL

(75) Inventor: Carsten Stausgaard, Bagsvaerd (DK)

(73) Assignee: E-MILL APS, Bagsvaerd (DK)

( * ) Notice: Subject to any disclaimer, the term of this patent is extended or adjusted under 35 U.S.C. 154(b) by 181 days.

(21) Appl. No.: 13/984,945

(22) PCT Filed: Feb. 10, 2012

(86) PCT No.: PCT/EP2012/052344
§ 371 (c)(1),
(2), (4) Date: Nov. 18, 2013

(87) PCT Pub. No.: WO2012/107578
PCT Pub. Date: Aug. 16, 2012

(65) Prior Publication Data
US 2014/0062092 A1    Mar. 6, 2014

(30) Foreign Application Priority Data
Feb. 11, 2011 (EP) ..................... 11154228

(51) Int. Cl.
*F03B 7/00* (2006.01)
*F03B 17/06* (2006.01)
(Continued)

(52) U.S. Cl.
CPC .............. *F03B 17/062* (2013.01); *F03B 7/00* (2013.01); *F03B 13/00* (2013.01); *F03B 13/10* (2013.01);
(Continued)

(58) Field of Classification Search
CPC ........ F03B 7/00; F03B 13/10; F05B 2220/20; F05B 2220/602
(Continued)

(56) References Cited

U.S. PATENT DOCUMENTS 2,112,889 A * 4/1938 Grondahl .............. F03B 17/065
                                                      415/141
4,488,055 A * 12/1984 Toyama .......................... 290/53
(Continued)

FOREIGN PATENT DOCUMENTS

BE        1017699        4/2009

OTHER PUBLICATIONS

International Search Report on corresponding PCT application (PCT/EP2012/052344) from International Searching Authority (EPO) dated May 2, 2012.
(Continued)

*Primary Examiner* — Julio C. Gonzalez
(74) *Attorney, Agent, or Firm* — Klein, O'Neill & Singh, LLP (57) ABSTRACT

A waste-watermill for generating electrical energy from a flow of waste water running through an underground waste-water conduit. The flow of waste water defines a free surface and a flow direction inside the waste water conduit. The waste-watermill comprises 1) a water wheel for being driven by the flow of waste water in an undershot configuration, 2) an axle for defining an rotational axis for the water wheel, where the flow of waste water passes below and transverse to the rotational axis in the undershot configuration, 3) a wheel support for rotationally supporting the water wheel in the undershot configuration and in a stationary position relative to the underground waste-water conduit, and 4) an electric generator operatively connected with the water wheel and the axle for being driven by the water wheel to produce electrical energy.

10 Claims, 8 Drawing Sheets

(51) Int. Cl.
 *F03B 13/00* (2006.01)
 *F03B 13/10* (2006.01)
(52) U.S. Cl.
 CPC ........ *F03B 17/063* (2013.01); *F05B 2220/20* (2013.01); *F05B 2220/602* (2013.01); *Y02B 10/50* (2013.01); *Y02E 10/223* (2013.01); *Y02E 10/28* (2013.01)
(58) Field of Classification Search
 USPC .......... 290/43, 54; 416/101, 86, 85; 415/3.1, 415/210.1; 406/191, 192, 194
 See application file for complete search history.

(56) References Cited

U.S. PATENT DOCUMENTS

| | | | |
|---|---|---|---|
| 5,140,856 A * | 8/1992 | Larsen | F03D 1/003 |
| | | | 416/144 |
| 7,768,146 B2 * | 8/2010 | Balzano | 290/54 |
| 8,344,536 B1 * | 1/2013 | Gotay | 290/54 |
| 8,540,489 B2 * | 9/2013 | Bouvet | F03B 1/02 |
| | | | 415/202 |
| 8,951,018 B1 * | 2/2015 | Calamia | 416/228 |
| 2005/0248161 A1 * | 11/2005 | Heidel | 290/54 |
| 2007/0182159 A1 * | 8/2007 | Davis | 290/54 |
| 2010/0084862 A1 * | 4/2010 | Unno | 290/43 |
| 2010/0308591 A1 * | 12/2010 | Godfrey | 290/54 |
| 2012/0032451 A1 * | 2/2012 | Heitmann et al. | 290/1 D |

OTHER PUBLICATIONS

Written Opinion on corresponding PCT application (PCT/EP2012/052344) from International Searching Authority (EPO) dated May 2, 2012.

\* cited by examiner

UNDERGROUND WATERMILL

CROSS-REFERENCE TO RELATED APPLICATION

This application is a national phase filing, under 35 U.S.C. §371(c), of International Application No. PCT/EP2012/052344, filed on Feb. 10, 2012, the disclosure of which is hereby incorporated by reference in its entirety.

FEDERALLY SPONSORED RESEARCH OR DEVELOPMENT

Not Applicable

BACKGROUND

The invention relates to a watermill for generating electrical energy from a flow of waste water running through an underground waste-water conduit.

It is well known to generate electricity through a flow of water generated by the gravitational force acting on the water. Usually, large structures are built for the specific purpose of generating hydro power, e.g. conventional or run-of-the-river hydroelectric power stations, which requires large dams to function, and tidal power station, which require elaborate support structures in or on the water. These techniques require large and costly installations to generate a water flow and/or to position station in a flow, in particular if the generation of the electricity is to be efficient.

In many urban environments there are already installations that generate a flow of water, in particular waste water, in the form of underground waste-water conduits, e.g. storm drains and sewers. It is known to generate electrical energy from waste-water in underground conduits, e.g., see BE1017699A6. However, the known techniques do not efficiently convert a flow of waste-water to electrical energy. It is therefore an object of the present invention to efficiently and safely generate electrical energy from the flow of waste-water in an urban environment. It is a further object to provide a low cost water-mill that can be integrated in conventional underground waste-water systems.

SUMMARY

The above object is according to a first aspect of the present invention met by a waste-watermill for generating electrical energy from a flow of waste water running through an underground waste-water conduit, the flow of waste water defining a free surface and a flow direction inside the waste water conduit, the waste-watermill comprising: a water wheel for being driven by the flow of waste water in an undershot configuration, an axle for defining an rotational axis for the water wheel, the flow of waste water passing below and transverse to the rotational axis in the undershot configuration, a wheel support for rotationally supporting the water wheel in the undershot configuration and in a stationary position relative to the underground waste-water conduit, and an electric generator operatively connected with the water wheel and the axle for being driven by the water wheel to produce electrical energy. The flow of waste water may pass perpendicularly to the rotational axis in the undershot configuration.

The above object is according to an alternative definition of the first aspect of the present invention obtained by a waste-watermill for generating electrical energy from a flow of waste water running through an underground waste-water conduit, the flow of waste water defining a free surface and a flow direction inside the waste water conduit, the waste-watermill comprising: a water wheel for being driven by the flow of waste water in an undershot configuration, an axle for defining an rotational axis for the water wheel, the rotational axis being positioned above the free surface and oriented transverse to the flow direction in the undershot configuration, a wheel support for rotationally supporting the water wheel in the undershot configuration and in a stationary position relative to the underground waste-water conduit, and an electric generator operatively connected with the water wheel and the axle for being driven by the water wheel to produce electrical energy. The rotational axis may be perpendicular to the flow direction.

Wastewater may be water that has been adversely affected by human activity or adversely affecting human activity. The waste water may be sewage, runoff water from streets or urban areas, or a combination thereof. Sewage is here understood to encompass water-carried waste that are intended to flow away from a community. The water-carried waste may be either in solution or suspension. The sources of the sewage may be domestic, municipal, and/or industrial. Waste-water conduit is here understood to encompass a structure leading the waste water in a sanitary sewer, a storm-drain, or a combination thereof. The waste water may also be cooling-water, e.g. from a power plant, and the cooling water may be a re-circulating, e.g., the flow of the waste may be heat driven and fed back to the power plant.

Underground is here understood to specify that waste-water conduit itself is located below ground level and that it is an overbuilt structure, e.g. it may be a buried tube or a dug out tunnel. One possible power source for the waste-water-mill is gravitationally driven water. The flow direction may be defined by a downward flow, e.g. caused by a slope of a few tens of a degree in a sewer system, by a mechanically driven flow, e.g. caused by mechanical pumps, or a combination thereof. That the waste water has a free surface means that the waste-water conduit is not completely filled with waste water, but there is a volume of air or gas above the waste water.

The stationary position of the water wheel relative to the underground waste-water conduit means that the rotational axis around which the water wheel can rotate is fixed relative to the waste-water conduit. That the electric generator is operative connected with the water wheel and the axle means that when the water wheel rotates, the electric generator produces electrical energy.

The stationary position of the water wheel relative to the underground waste-water conduit allows for the water wheel to have a diameter greater than the inner dimensions of the waste water conduit and of a passageway connected with the waste-water conduit, if the wheel is mounted at the junction of the waste-water conduit and the passageway. The greater diameter in turn has the effect of an improved efficiency of the watermill.

The underground waste-water conduit may define an inner surface and the wheel support comprises a fastener for securing the wheel support to the inside surface. The underground waste-water conduit may define an inner surface comprising a side portion positioned between the bottom and the top of the underground waste-water conduit, and the fastener may be adapted for securing the wheel support to the side portion. The fastener may be adapted for securing the wheel support to a concrete and/or to a plastic structure. The fastener has the advantage that the waste-watermill can be installed in an already present and functioning waste-water conduit in an urban environment.

The water wheel may comprise a paddle for being pushed by the flow of waste water to drive the water wheel. The paddle may be oriented in a radial direction relative to the rotational axis. This orientation means that the paddle essentially radiate outwards from the rotational axis, i.e. that they face straight out along the radius of the water wheel. This has the advantage that the water wheel will function efficiently also at high levels of waste water in the waste-water conduit.

The water wheel may comprise a paddle support interconnecting the paddle and the axle for supporting the paddle. The paddle may be releasably attached to the paddle support. This allows for the paddles to be attached to the water wheel in situ, which means that the water wheel can have an effective diameter that is greater than the inner dimensions of the passageways or openings through which it must be transported or moved before being installed. The releasably attached paddle blade also allows for the paddle to be replaced if it is damaged or worn down by debris, such as small rocks and broken branches, in the waste water. The paddle support may be composed of a number of smaller elements for enabling an in situ assembling of the central portion. This also allows for a water wheel with an effective diameter that is greater than the inner dimensions of the passageways or openings through which it must be transported or moved before being installed.

The paddle support may be a cylinder and the symmetry axis of the cylinder may be collinear with the rotational axis. The cylinder may be a circular cylinder. This shape of the paddle support is favourable when the waste-water levels are so high that they reach the paddle support. The paddle support may have a first maximum extension perpendicular to the rotational axis and a second maximum extension parallel to the rotational axis, and the first maximum extension is greater than the second maximum extension. With this limitation of the dimension the paddle support will be less of an obstacle for the flow of waste water, allowing it to flow past the water wheel at each of the sides of paddle support should the waste water level reach that high. At the same time the limitation in dimensions will enable a large radius of the water wheel as a whole, thus increasing the delivered torque and the efficiency of the water wheel. The first maximum extension may be greater than the second maximum extension by a factor in one or more of the ranges 2 to 20, 3 to 10, 4 to 9, 5 to 8, 6 to 7, 2 to 3, 3 to 4, 4 to 5, 5 to 6, 6 to 7, 7 to 8, 8 to 9, 9 to 10, and 10 to 20.

The paddle support may be a hollow and airtight body. Thus, the paddle support diverts the waste water to flow at its sides, where to can act on the paddles. Further, debris in the waste water will not be caught by the paddle support. The hollowness allows for a lightweight paddle support that can be hauled through narrow passages below ground for installment in an old waste-water conduit.

The water wheel may comprise the axle, the water wheel may be fixed to the axle, the wheel support rotationally supports the axle, and the electric generator may operatively connected with the water wheel via the axle. This allows for en electric generator external to the water wheel. Alternatively, the wheel support may comprise the axle, the axle may be fixed to the wheel support, the axle may rotationally support the water wheel, and the electric generator may be a hub generator attached to the water wheel and the axle. The electric generator may be positioned within the paddle support. This is particularly advantageous if the paddle support is a hollow and airtight body.

The paddle may be curved to define a convex side and a concave side opposite from the convex side. The cross-section of the paddle perpendicular to the radial direction may correspond to an arc of a circle. The concave side may face the flow of waste water when the water wheel is driven by the waste water. It has been show that this geometry is particularly favourable when the waste-water conduit has a circular cross section.

The paddle may have a proximal point located at the paddle support and a distal point located at the outmost end of the paddle from the rotational axis, and the cross-section of the paddle perpendicular to the radial direction may have approximately the same curvature at all points between the proximal and distal point. This has the advantage that the water wheel will be efficient at a range of different levels of the waste water. The cross-section of the paddle parallel to the radial direction may have a curvature that is approximately zero. This has the advantage that the risk of debris getting caught by the paddle is reduced.

The paddle may extend from the paddle support in a direction defining an angle to the radial direction. This may have an advantage if the level of waste water is approximately constant; in particular if the paddle is arranged to tangentially meet the free surface of the waste water.

The paddle may define a portion of a cylindrical surface, and the paddle may extend parallel to the symmetry axis of the cylindrical surface. The paddle may comprise a narrow portion and a wide portion, the narrow portion may be located closer to the rotational axis than the wide portion, the narrow portion may have a third maximum extension parallel to the rotational axis, the wide portion may have a fourth maximum extension parallel to the rotational axis, and the third maximum extension may be smaller than the fourth maximum extension. With this geometry, the paddle is efficient at a wider range of levels of waste water.

The paddle may define a paddle profile when viewed in a direction perpendicular to the radial direction and the rotation axis, and the paddle profile may have a curved distal edge. The distal edge is here to be understood as an edge interconnecting two side edges on opposite sides of the paddle and the furthest point on the paddle from the rotational axis is located on the distal edge. The curved distal edge reduces the risk of debris getting caught between the paddle and the waste-water conduit, which would prevent the water wheel from turning and cause the waste water-mill to stop functioning. The curved distal edge may correspond to a portion of a circle, or the curved distal edge may define a rounded protuberance. Alternatively or additionally, the paddle may define a paddle profile when viewed in a direction perpendicular to the radial direction and the rotation axis, and the paddle profile may have a curved distal edge corresponding to the bottom portion of a cross-sectional cut of the waste-water conduit. This allows for an efficient water wheel.

The water wheel may comprise a plurality of additional paddles similar to the paddle already described.

The wheel support may be adapted for positioning the water wheel such that the rotational axis is located above the top of the waste-water conduit in the undershot configuration. This has the advantage that the watermill will function efficiently also when the free surface of the waste water is close to the top of the waste-water conduit. The wheel support may be adapted for positioning the water wheel such that the rotational axis is located below the top of the waste-water conduit and closer to the top of the waste-water conduit than to the bottom of the waste-water conduit. This positioning is advantageous at typical waste water levels for the most common waste water conduits types and dimensions. The waste-water conduit may defines a first height corresponding to the average inner vertical dimension of the waste-water conduit, the wheel support may be adapted for positioning the water wheel such that the rotational axis is located at a second height relative to the bottom of the waste-water conduit, and the ratio of the second height over the first height may be in one or more of the ranges 0.5 to 0.6, 0.6 to 0.7, 0.7 to 0.8, 0.8 to 0.9, and 0.9 to 1.0, and/or in one or more of the ranges 0.7 to 0.8, 0.6 to 0.9, and 0.5 to 1.

The generator may be located at a first elevation from the bottom of the waste-water conduit and the rotational axis may be located at a second elevation from the bottom of the waste-water conduit, and the first and second elevations may be approximately equal or the first elevation is greater than the second elevation. Alternatively, the generator may be located above the rotational axis. Alternatively or additionally, the generator may be located above the top of the waste-water conduit. This has the advantage that the risk of waste water reaching the electric generator is reduced.

The underground waste-water conduit may be connected with an underground passageway, and the waste-watermill may further comprise: a watertight partition for sealing off the underground passageway from the waste-water conduit for preventing waste water to flow into the underground passageway, the watertight partition defining an aperture allowing the wheel axle to pass through the watertight partition, and the electric generator is adapted to be positioned on the side of the partition that is opposite from the side on which the water wheel is positioned. The electric generator may be attached to and supported by the partition. The waste-watermill may further comprise: a seal for preventing waste water of the flow of waste water to flow between the watertight partition and the wheel axle.

A first portion of the wheel support may be attached to the watertight partition, and a second portion of the wheel support may be adapted for being attached to and supported by the waste-water conduit on the opposite side of the water wheel from the watertight partition.

The waste-watermill may further comprise: a door attached to the waste-water conduit for closing off the waste water conduit to reduce or stop the flow of waste water running past the water wheel. The door may be located upstream from the water wheel relative to the flow of waste water. The waste-watermill may further comprise: a bypass conduit connecting to the waste-water conduit at a first point upstream from the water wheel and at a second point downstream from the water wheel, for allowing the flow of waste water to circumvent the water wheel. The door may be located downstream from the first point relative to the flow of waste water.

The waste-watermill may further comprise: a shield for being inserted upstream from the water wheel relative to the flow of waste water, and a shield actuator for moving the shield between a retracted state and inserted state, the shield diverting at least some the flow of waste water away from the water wheel in the inserted state, and diverting less or none of the waste water away from the water wheel in the retracted state as compared to the inserted state.

The shield may comprise: a casing defining an inner space for accommodating a portion of or the whole of the water wheel in the inserted state, and the shield actuator may comprise a guide rail for supporting the casing relative to the waste-water conduit and for allowing the casing to move between the retracted and inserted states. The waste-watermill may comprise: an upper casing defining a first arc of a cylinder having a first inner space for accommodating a corresponding arc of the water wheel, and the shield comprising, the shield may comprise: a lower casing defining a first arc of a cylinder having a second inner space for accommodating a corresponding arc of the water wheel, the upper casing being adapted for accommodating a portion of or the whole of the lower casing, or the lower casing being adapted for accommodating a portion of or the whole of the upper casing, and the shield actuator may comprise: a rotational support for rotationally connecting the lower casing to the axle for allowing the lower casing to rotate between the retracted and inserted states. The upper and lower casings may be adapted for completely covering the water wheel with the lower casing in the shield in the inserted state.

Both the first aspect of the present invention and the alternative definition of the first aspect of the present invention may comprise any single feature described above or any working combination of any number of the features described above.

The above object is according to a second aspect of the present invention met by a method for generating electrical energy from a flow of waste water running through an underground waste-water conduit of an underground sewer structure, the flow of waste water defining a free surface and a flow direction inside the waste water conduit, the method comprising: providing a water wheel for being driven by the flow of waste water in an undershot configuration, providing an axle for defining a rotational axis for the water wheel, positioning the rotational axis above the free surface, orienting the axle transverse to the flow direction, providing a wheel support for rotationally supporting the water wheel in a stationary position relative to the underground waste-water conduit, securing the wheel support to the underground sewer structure for supporting the water wheel in the undershot configuration, providing an electric generator for producing electrical energy, and operatively connecting the generator with the water wheel for driving the electric generator by the water wheel. The water wheel, the axle, the wheel support, and the electric generator may constitute a waste-watermill, and the waste-watermill may further comprise any of the features according to the first aspect of the present invention or to the alternative definition of the first aspect of the present invention.

BRIEF DESCRIPTION OF DRAWINGS

A multitude of embodiments of the different aspects of the present invention are depicted below, where.

DETAILED DESCRIPTION

Figure 1A:
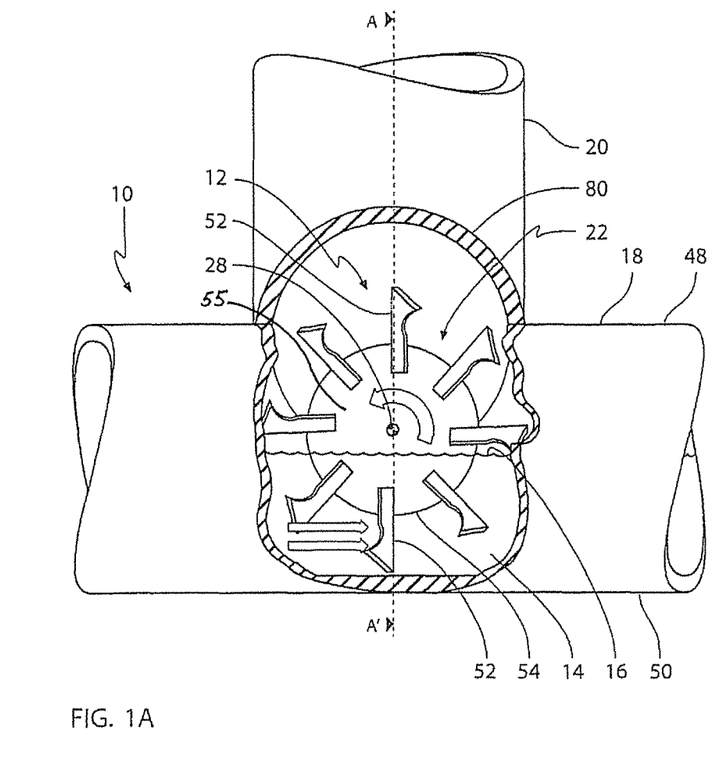
FIG. 1A illustrates a preferred embodiment of the waste-watermill positioned in an underground sewer viewed from the side with respect to the flow of the waste-water.
Figure 1B:
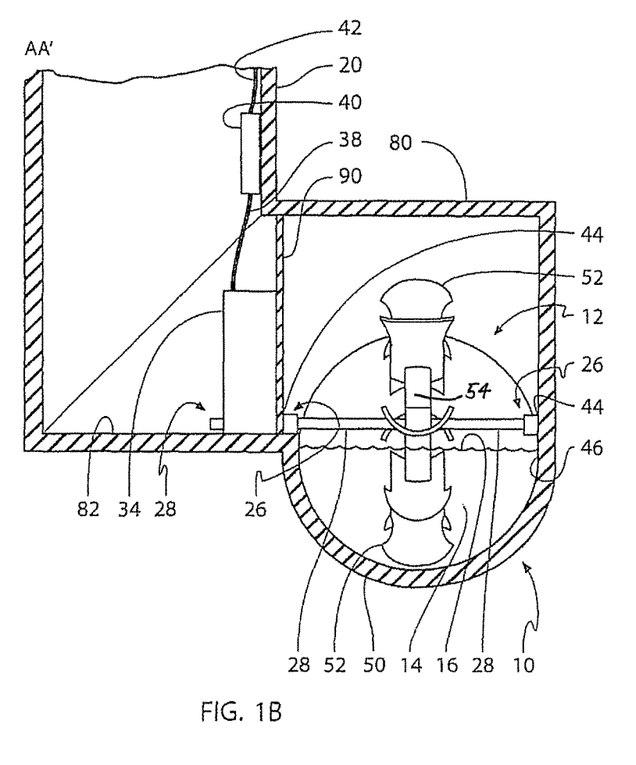
FIG. 1B illustrates the waste-watermill of FIG. 1A viewed in the direction of the flow of waste water.

FIGS. 1A-B illustrate a preferred embodiment of the waste-watermill 12 positioned in a sewer 10 underground. Waste water 14 runs at the bottom 50 of the waste water conduit 18 in the direction indicated by the straight arrows. The waste-water conduit 18 is a concrete pipe with a circular cross section and is oriented to define a slope of a few tenths of a percent. The waste-water conduit 18 is joined at one of its side by an essentially vertically oriented manhole or passageway 20. The waste-watermill 18 is positioned at the junction between the waste-water conduit 18 and the manhole 20. The waste water 14 has a free surface 16 within the waste-water conduit 18, which means that the waste-water conduit 18 is not filled completely to the top 48. The waste watermill 12 has a watertight partition 90 that closes off the manhole 20 from the waste-water conduit 18 so that the waste water 14 is prevented from flowing into the manhole 20 if the free surface 16 reaches above the floor 82 of the manhole 20.

The waste-watermill 12 has a water wheel 22 centred on and rigidly attached to a wheel axle 28 defining the rotational axis 24. The wheel axle 28 is rotationally supported by a wheel support 26. The wheel support 26 engages the wheel axle 28 at both ends of the wheel axle 28 by a set of ball bearings that provides a low-friction rotational support of the water wheel 22. The wheel support 26 has on one side of the wheel axle 28 a fastener 44 in the form of expander plugs that are inserted into holes in the side portion 46 of the waste water conduit 18 and screws engaging the expander plugs. On the other side of the wheel axle 28 the wheel support 26 is attached to the watertight partition 90, which in turn is attached to the manhole 20. The wheel support 26 positions the water wheel 22 such that the rotational axis 24 is below the top 48 of the waste-water conduit 18 and located closer to the top 48 than the bottom 50 of the waste-water conduit 18.

The water wheel 22 has eight paddles 52 spaced apart at regular intervals and extending radially outwards from the rotational axis 24. The paddles 52 have been attached to a paddle support 54 by paddle fasteners in the form bolts and nuts that allows for an in situ mounting, i.e. at the junction between the manhole 20 and the waste-water conduit 18. The maximum extension of the water wheel 22 perpendicular to the rotational axis 24 is greater than the inner diameters of the waste-water conduit 18 and the manhole 20, which is possible due to the in situ attaching of the paddles 52. The maximum extension of the water wheel 22 is effectively defined by the paddles 52. The paddle support 54 is shaped like a cylinder with a hollow interior 55 and a diameter over length ratio of 6.6.

The wheel axle 28 passes through an aperture of the watertight partition 90 and a seal prevents waste water from leaking between the wheel axle and the watertight partition 90. The waste-watermill 12 has a generator 34 attached to and supported by the watertight partition 90 and connected to the wheel axle 28. The wheel axle 28 enters the generator 34, which has an automatic gear box for transforming the rotational speed of the wheel axle 28 to an optimum rotational speed for the generator 34. Thus, the electric generator 34 produces electrical energy when the water-wheel 22 is driven by the flow of waste water 14. The rotation of the water wheel 22, when the driven by the flow of waste water 14, is indicated by a curved arrow. The electric generator 34 is coupled to a grid adapter 40 that transforms the electrical energy produced by the electric generator 34 to a form suitable to be supplied to the grid 42.

Figure 2A:
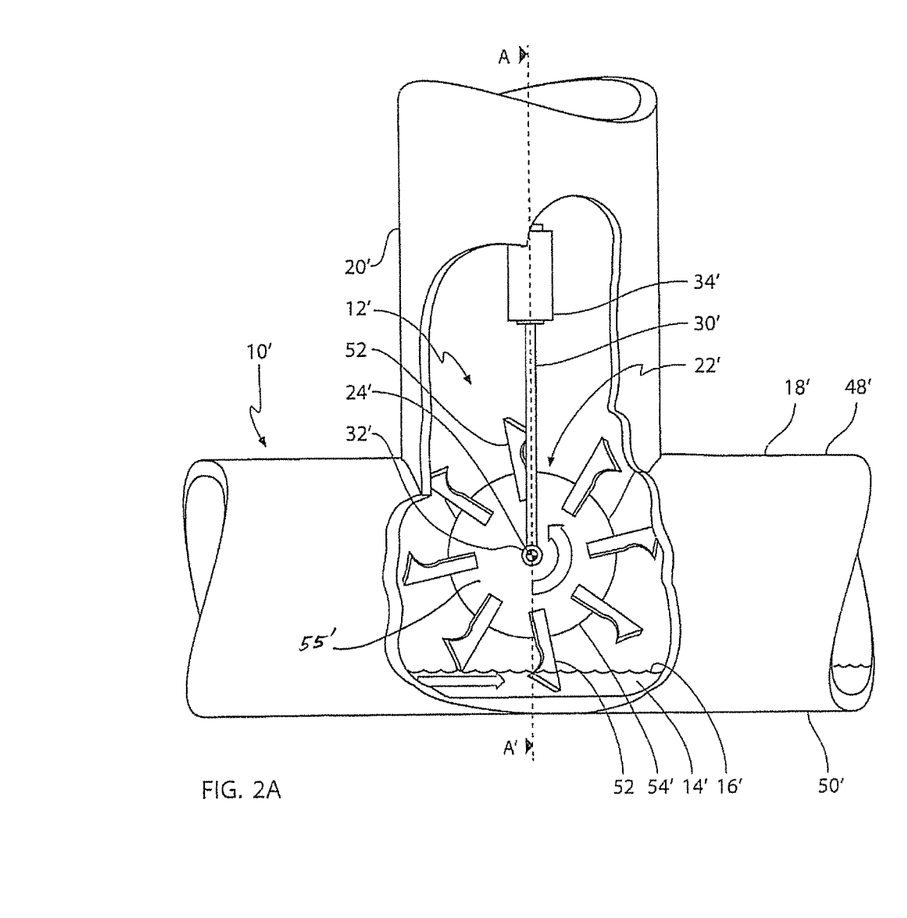
FIG. 2A illustrates an alternative embodiment of the waste-watermill positioned in an underground sewer viewed from the side with respect to the flow of the waste-water.
Figure 2B:
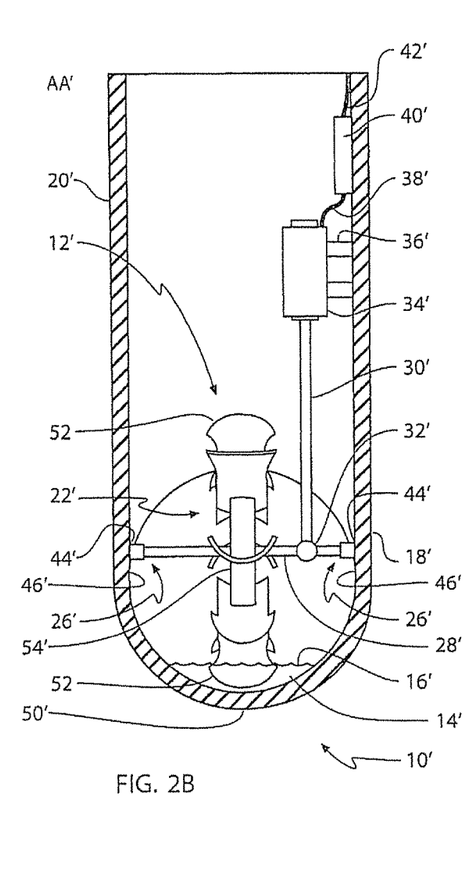
FIG. 2B illustrates the waste-watermill of FIG. 2A viewed in the direction of the flow of waste water.

FIGS. 2A-B illustrate an alternative embodiment of the waste-watermill 12' positioned in a sewer 10' underground. Waste water 14' runs at the bottom 50' of the waste water conduit 18' in the direction indicated by the straight arrows. The waste-water conduit 18' is a concrete pipe with a circular cross section and is oriented to define a slope of a few tenths of a percent. The waste-water conduit is joined by an essentially vertically oriented manhole 20' at its top 48. The waste-watermill 18' is positioned at the junction between the waste-water conduit 18' and the manhole 20'. The waste water 14' has a free surface 16' within the waste-water conduit 18', which means that the waste-water conduit 18' is not filled completely to the top 48'.

The waste-watermill 12' has a water wheel 22' centred on and rigidly attached to a wheel axle 28' defining the rotational axis 24'. The wheel axle 28' is rotationally supported by a wheel support 26'. The wheel support 26' engages the wheel axle 28' at both ends of the wheel axle 28' by a set of ball bearings that provides a low-friction rotational support of the water wheel 22'. The wheel support 26' further comprises fasteners 44' in the form of expander plugs that are inserted into holes in the side portions 46' of the waste water conduit 18' and screws engaging the expander plugs. The wheel support 26' positions the water wheel 22' such that the rotational axis 24' is below the top 48' of the waste-water conduit 18' and located closer to the top 48' than the bottom 50' of the waste-water conduit 18'.

The water wheel 22' has eight paddles 52 spaced apart at regular intervals and extending radially outwards from the rotational axis 24'. The paddles 52 have been attached to a paddle support 54' by paddle fasteners in the form of bolts and nuts that allow for an in situ mounting, i.e. at the junction between the manhole 20' and the waste-water conduit 18'. The maximum ex-tension of the water wheel 22' perpendicular to the rotational axis 24' is greater than the inner diameters of the waste-water conduit 18' and the manhole 20', which is possible due to the in situ attaching of the paddles 52. The maximum extension of the water wheel 22' is effectively defined by the paddles 52'. The paddle support 54' is shaped like a cylinder with a hollow interior 55' and a diameter over length ratio of 6.6.

The wheel axle 28' is coupled to a generator axle 30' via a bevel gear 32'. The generator axle 30' in turn is coupled to an electric generator 34' that is supported by a generator support 36'. The generator support 36' includes expander plug and screw arrangements that rigidly attaches the electric generator 34' to the wall of the manhole 20'. Thus, the electric generator 34' produces electrical energy when the water-wheel 22' is driven by the flow of waste water 14'. The rotation of the water wheel 22', when driven by the flow of waste water 14', is indicated by a curved arrow. The electric generator 34' is coupled to a grid adapter 40' that transforms the electrical energy produced by the electric generator 34' to a form suitable to be supplied to the grid 42'.

Figure 3A:
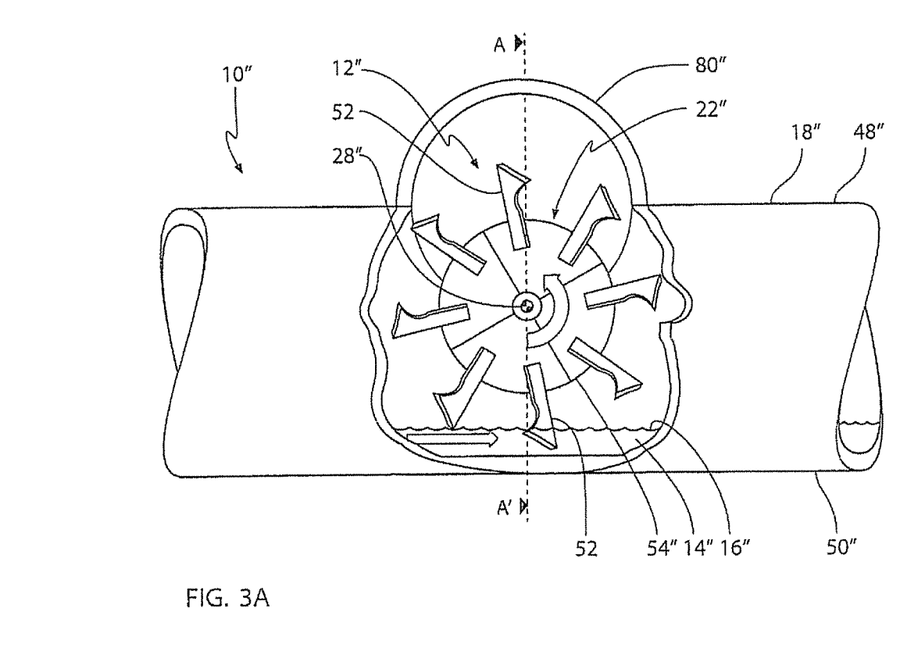
FIG. 3A illustrates an alternative embodiment of the waste-watermill positioned in an underground sewer viewed from the side with respect to the flow of the waste-water.
Figure 3B:
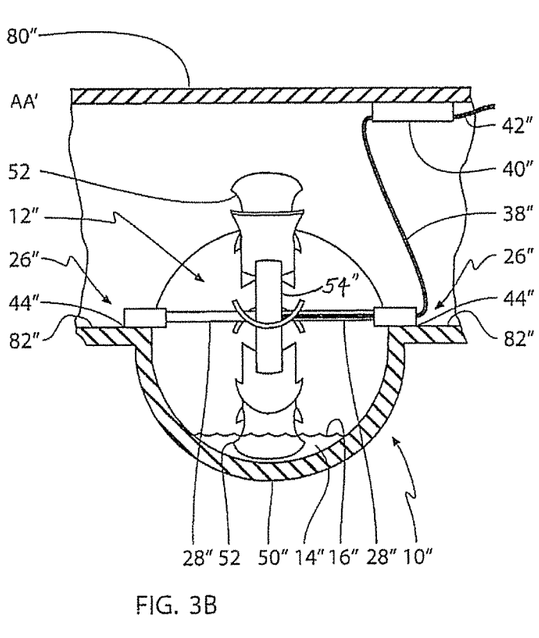
FIG. 3B illustrates the waste-watermill of FIG. 3A viewed in the direction of the flow of waste water.

FIGS. 3A-B illustrate an alternative embodiment of the waste-watermill 12" positioned in a sewer 10" underground. Waste water 14" runs at the bottom 50" of the waste water conduit 18" in the direction indicated by the straight arrows. The waste-water conduit 18" is a concrete pipe with a circular cross section and is oriented to define a slope of a few tenths of a percent. The waste-water conduit is joined by an essentially horizontally oriented underground passageway 80". The waste-watermill 18" is positioned at the junction between the waste-water conduit 18" and the passageway 80". The passageway 80" is at a right angle to the waste-water conduit 18" and has a circular cross-section. The floor 82" of the passageway 80" is located above the bottom 50" of the waste-water conduit 18". The waste water 14" has a free surface 16" within the waste-water conduit 18", which means that the waste-water conduit 18" is not filled completely to the top 48".

The waste-watermill 12" has a water wheel 22" centred on a wheel axle 28" defining the rotational axis 24". The water wheel 22" is rotationally supported by the axle 28". The wheel axle 28" is rigidly attached to a wheel support 26" at both of its ends. The water wheel 22" has a ball bearing centred on the wheel axle 28" that provides a low-friction rotational support of the water wheel 22". The wheel support 26" further comprises fasteners 44" in the form of expander plugs that are inserted into holes in the floor 82" of the passageway 80" on either sides of the waste-water conduit 18". The wheel support 26 positions the water wheel 22" such that the rotational axis 24" is below the top 48" of the waste-water conduit 18" and located closer to the top 48" than the bottom 50" of the waste-water conduit 18".

The water wheel 22" has eight paddles 52 spaced apart at regular intervals and extending radially outwards from the rotational axis 24". The paddles 52 are attached to a paddle support 54". The paddle support 54" is composed of five subunits. One subunit is a cylindrical centre and the other four subunits are identical circular sectors. Each circular sector has two paddles 52 and connects to the cylindrical centre such that the paddle support 54" when put together is cylindrical with a diameter over length ratio of 6.6. The maximum extension of the water wheel 22" perpendicular to the rotational axis 24" is greater than the inner diameters of the waste-water conduit 18" and the underground passageway 80", which is possible due to the in situ attaching of the paddles 52. The maximum extension of the water wheel 22" is defined by the paddles 52.

The waste-watermill 12" has an electric hub generator covered by the paddle support 54" and coupled to the axle 30" and the water wheel 22". The electric hub generator produces electrical energy when the water-wheel 22" is driven by the flow of waste water 14". The rotation of the water wheel 22", when driven by the flow of waste water 14", is indicated by a curved arrow. The electric hub generator is coupled to a grid adapter 40" via an electric coupling 38" in the form of a cable running along the wheel axle 28" and further along the wall of the passageway 80" to the grid adapter 40". The grid adapter 40", which is attached to the wall of the passageway 80", transforms the electrical energy produced by the electric generator 34" to a form suitable to be supplied to the grid 42".

Figure 4A:
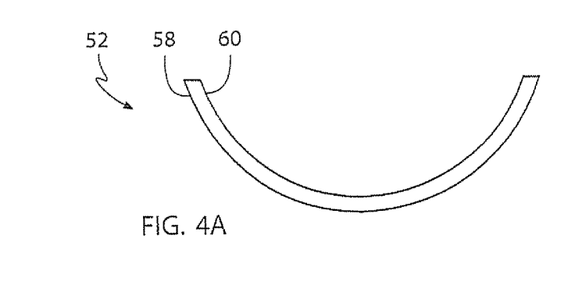
FIGS. 4A-C illustrate a preferred embodiment of a paddle.
Figure 4B:
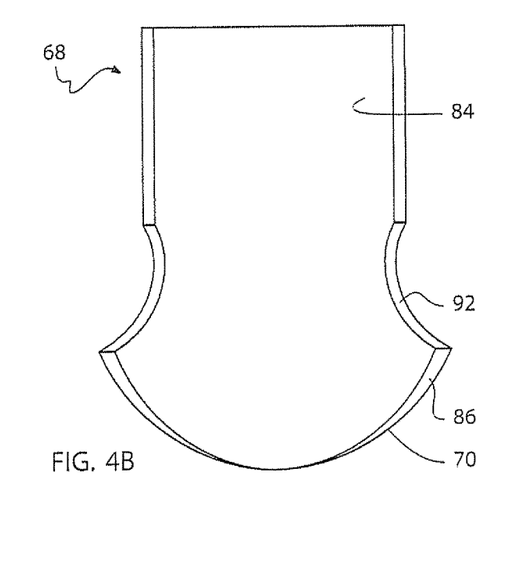
Figure 4C:
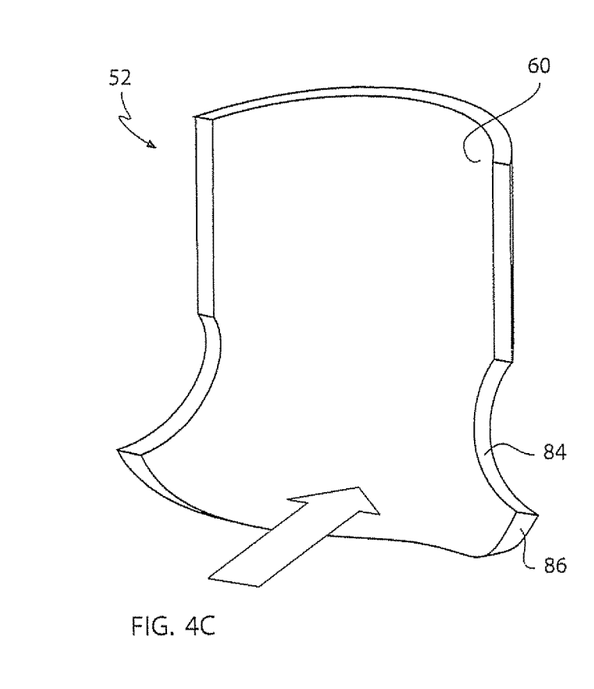
Figure 5A:
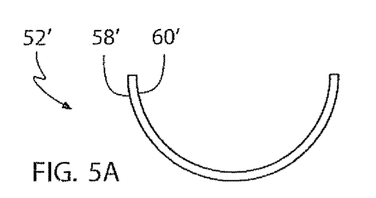
FIGS. 5A-C illustrate a portion of a first alternative embodiment of a paddle.
Figure 5B:
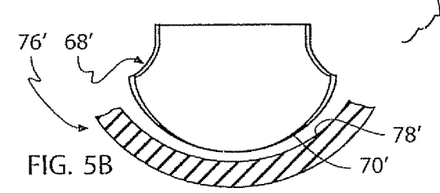
Figure 5C:
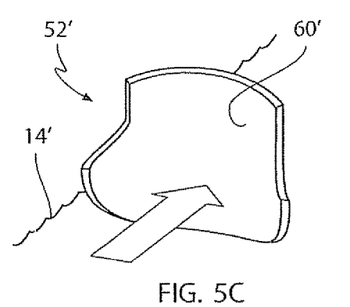

FIGS. 4A-C illustrate the paddles 52 in FIGS. 1A-B, 2A-B, and 3A-B in greater detail. FIG. 5A illustrates the paddle 52 viewed in the radial direction relative to the rotational axes as defined in relation to FIGS. 1A-B, 2A-B, and 3A-B. The paddle 52 has a convex side 58 and a concave side 60 and is cut from a cylindrical body having a uniform wall thickness. FIG. 5B illustrates the profile 68 of the paddle 52 in its lowest possible position and when viewed from the direction of the flow, i.e. when viewed in a direction corresponding to a view in a direction perpendicular to the rotational axis and to the radial direction along which the paddle extends as defined in relation to FIGS. 1A-B, 2A-B, and 3A-B. The profile 68 of the paddle 52 has a curved distal edge 70 that corresponds to a portion of a circle. A perspective view of the paddle 52 is shown in FIG. 5C. The flow of the waste water 14 is shown as an arrow in FIG. 5C and the paddle 52 is oriented such that the concave side 60 faces the flow of the waste water 14. The paddle has a narrow portion 84 and a wide portion 86 and the narrow portion 84 is located closer to the rotational axis than the wide portion 86. The wide portion 86 is joined to the narrow portion by a transition portion 92. The narrow portion 84 has a maximum extension parallel to the rotational axis that is smaller than the corresponding maximum extension of the wide portion and grater than the corresponding minimum extension of the transition portion 92.

FIGS. 5A-C illustrate a portion of an alternative paddle 52' viewed from the same three directions as in FIGS. 4A-C. The paddle 52' has a convex side 58' and a concave side 60' and is cut from a cylindrical body having a uniform wall thickness. The profile 68' of the paddle 52' has a curved distal edge 70' that corresponds to the inner profile 78' of a cross-sectional cut of a bottom portion 76' of the waste-water conduit as described in relation to FIGS. 1A-B, 2A-B, and 3A-B. The flow of the waste water 14' is shown as an arrow in FIG. 5C and the paddle 52' is oriented such that the concave side 60' faces the flow of the waste water 14'. The paddle has a narrow portion 84' and a wide portion 86' and the narrow portion 84' is located closer to the rotational axis than the wide portion 86'. The narrow portion 84' has a maximum extension parallel to the rotational axis that is smaller than the corresponding maximum extension of the wide portion.

Figure 6A:
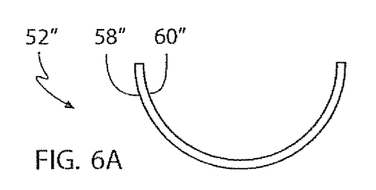
FIGS. 6A-C illustrate a portion of a second alternative embodiment of a paddle.
Figure 6B:
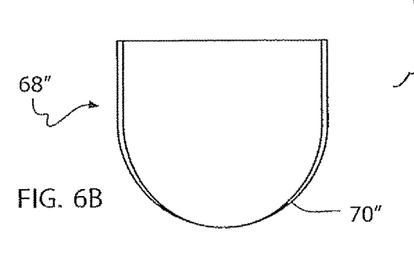
Figure 6C:
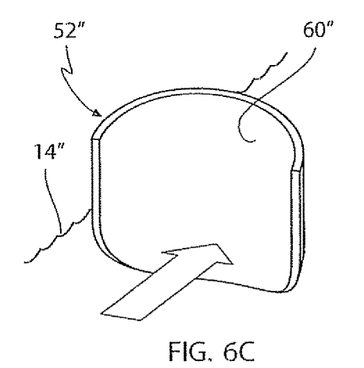

FIGS. 6A-C illustrate a portion of an alternative paddle 52" viewed from the same three directions as in FIGS. 4A-C. The paddle 52" has a convex side 58" and a concave side 60" and is cut from a cylindrical body having a uniform wall thickness. The profile 68" of the paddle 52" has a curved distal edge 70" that corresponds to an arc or portion of a circle. The flow of the waste water 14" is shown as an arrow in FIG. 6C and the paddle 52" is oriented such that the concave side 60" faces the flow of the waste water 14".

Figure 7A:
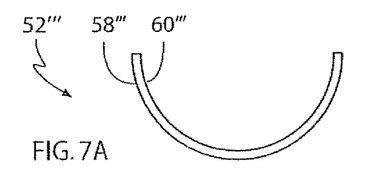
FIGS. 7A-C illustrate a portion of a third alternative embodiment of a paddle.
Figure 7B:
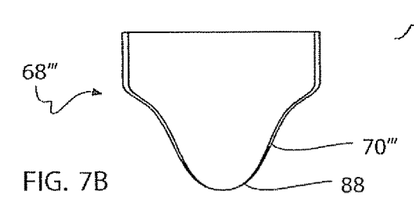
Figure 7C:
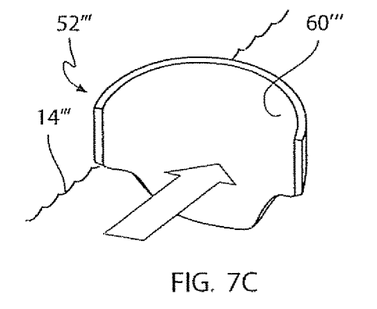

FIGS. 7A-C illustrate a portion of another alternative paddle 52''' viewed from the same three directions as in FIGS. 4A-C. The paddle 52''' has a convex side 58''' and a concave side 60''' and is cut from a cylindrical body having a uniform wall thickness. The profile 68''' of the paddle 52''' has a curved distal edge 70''' that defines a rounded protuberance 88. The flow of the waste water 14" is shown as an arrow in FIG. 7C and the paddle 52''' is oriented such that the concave side 60''' faces the flow of the waste water 14'''.

Figure 8A:
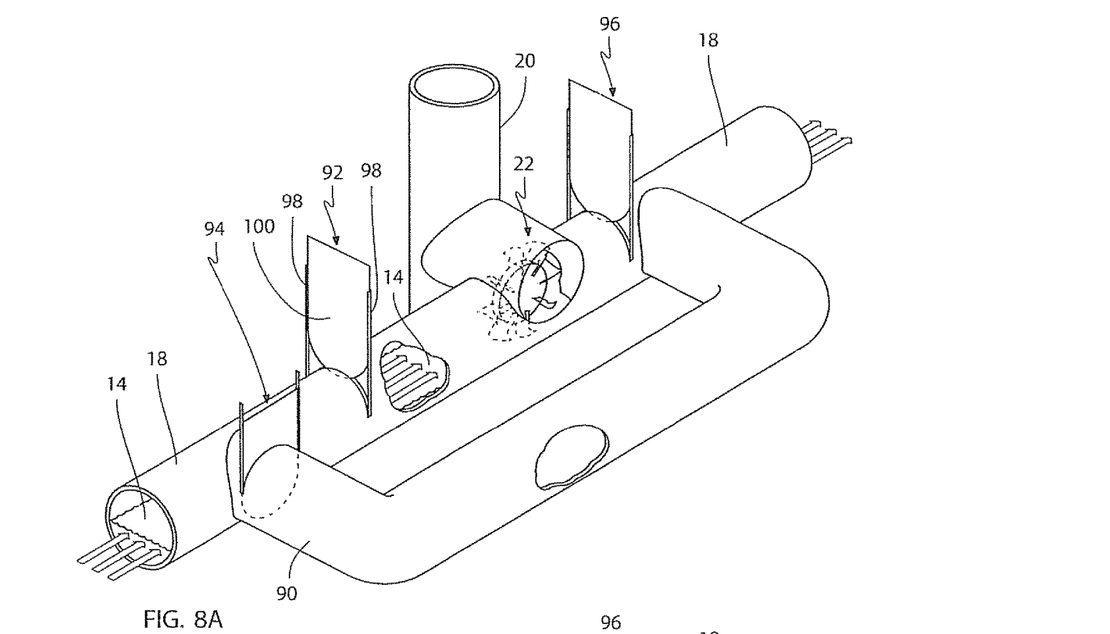
FIGS. 8A-B illustrate an alternative embodiment of the waster-watermill with a door for closing off the flow of waste water.
Figure 8B:
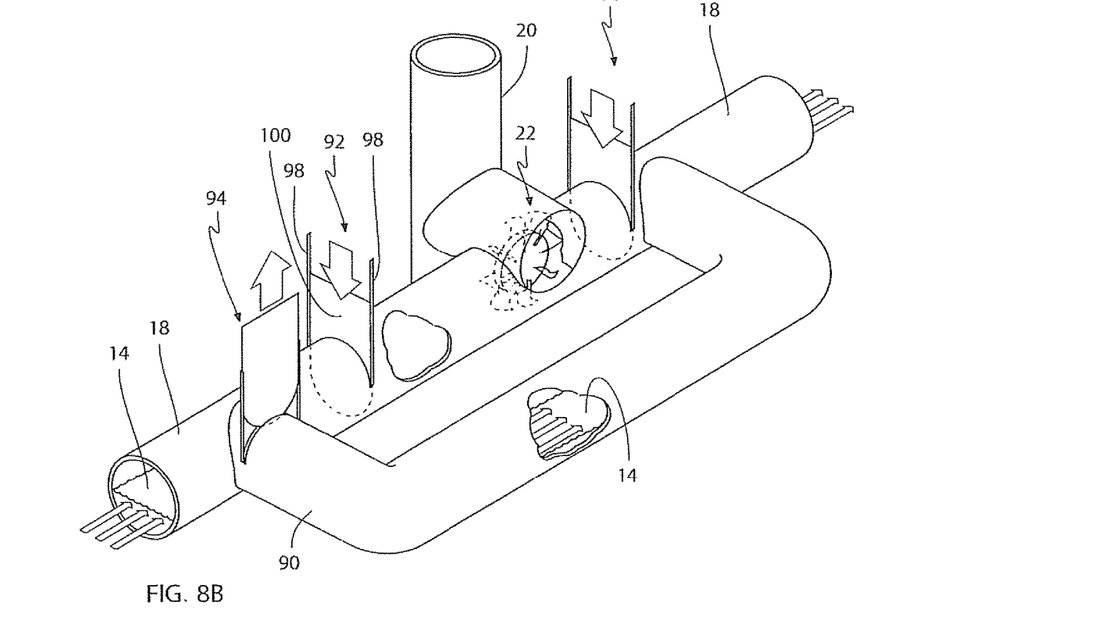

FIGS. 8A-B illustrate an alternative embodiment of the waster-watermill with a door 92 for closing off the flow of waste water 14 and preventing it from reaching the water wheel 22. The first door 92 is installed in the waste-water conduit 18 at a point upstream from the water wheel 22. The waste-water conduit 18 is connected to a manhole 20 at which the waste-watermill is located. A bypass conduit 90 connects to the waste-water conduit 18 at first point upstream from the waste-water wheel 22 and at a second point downstream from the waste-water wheel 22. A second door 94 is installed in the bypass conduit 90 at the first point, and a third door 96 is installed downstream from the water wheel 22 and upstream from the second point. The three doors are vertical sliding doors of the same type and each has two oppositely positioned guide rails 98 allowing a door blade 100 to slide vertically. The door blade 100 has a curved lower portion conforming to the curvature of the bottom of the conduits in which they are mounted, thus giving a tight sealing when closed.

In FIGS. 8A-B the different flows of waste water are indicated by arrows. When the first door 92 and the third door 96 are open, and the second door is closed, as is shown in FIG. 8A, the flow of waste water reaches the water wheel 22. When the first door 92 and the third door 96 are closed, and the second door is open, as is shown in FIG. 8B, the flow of waste water does not reach the water wheel 22, which allows for the water wheel to be serviced or repaired free from the waste water.

Figure 9A:
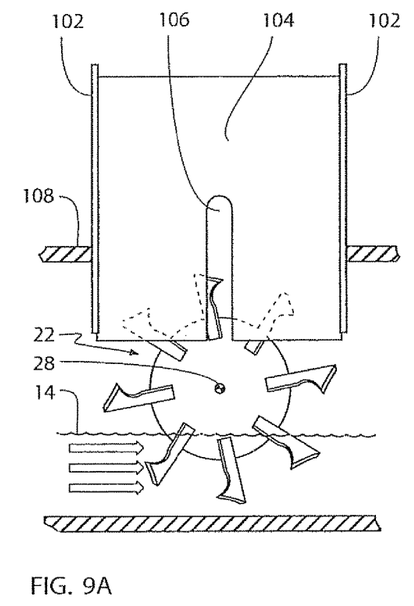
FIGS. 9A-B illustrate a slide-able shield for protecting the water wheel.
Figure 9B:
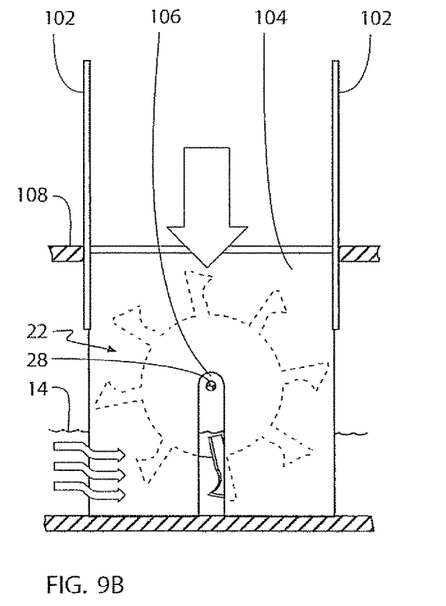

FIGS. 9A-B illustrate a slide-able shield for protecting the water wheel 22. The shield has a casing 104 defining an inner space that can accommodate the water wheel 22. The casing 104 is positioned above the water wheel 22 and is supported by oppositely positioned guide rails 102 attached to the structure 108 of the waste-water conduit, which allows the casing 104 to slide vertically between a retracted state, as is shown in FIG. 9A, and an inserted state, as is shown in FIG. 9B. The casing 104 has a slit 106 into which the axle 28 passes when shifting from the retracted state to the inserted state. In the retracted state, the flow of waste water 14, which is indicated by arrows, reaches the water wheel 22, while in the inserted state the casing 104 diverts the flow of waste water 14 away from the water wheel 22.

Figure 10A:
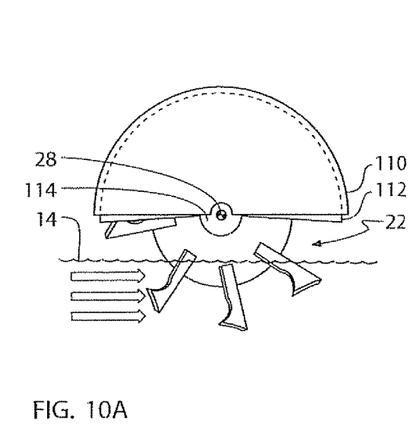
FIGS. 10A-B illustrate a rote-able shield for protecting the water wheel.
Figure 10B:
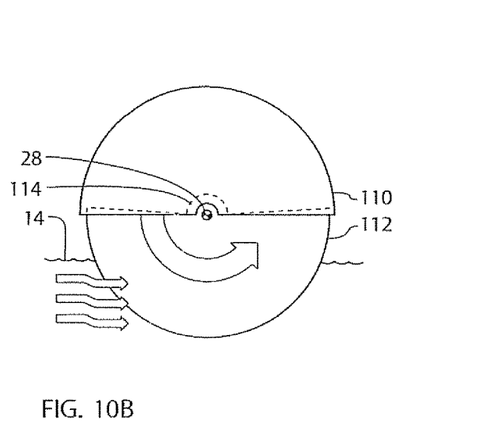

FIGS. 10A-B illustrate a rotate-able shield for protecting the water wheel 22. The shield has an upper casing 110 and a lower casing 112. The upper casing 110 defines an approximately 180 degree arc of a cylinder defining an inner space which accommodates a corresponding arc of the water wheel 22. The lower casing 110 defines an approximately 185 degree arc of a cylinder defining an inner space which accommodates a corresponding arc of the water wheel 22. The upper casing 110 is rigidly attached to the structure of the waste water conduit and the lower casing 112 has a protruding portion 114 that is rotationally connected to the axle 28. The rotational connection to the axle allows the lower casing 112 to rotate between a retracted state, as is shown in FIG. 10A, and an inserted state, as is shown in FIG. 10B. The upper casing 110 receives the lower casing 112 in the retracted state. In the retracted state, the flow of waste water 14, which is indicated by arrows, reaches the water wheel 22, while in the inserted state the casing 104 diverts the flow of waste water 14 away from the water wheel 22.

Figure 11:
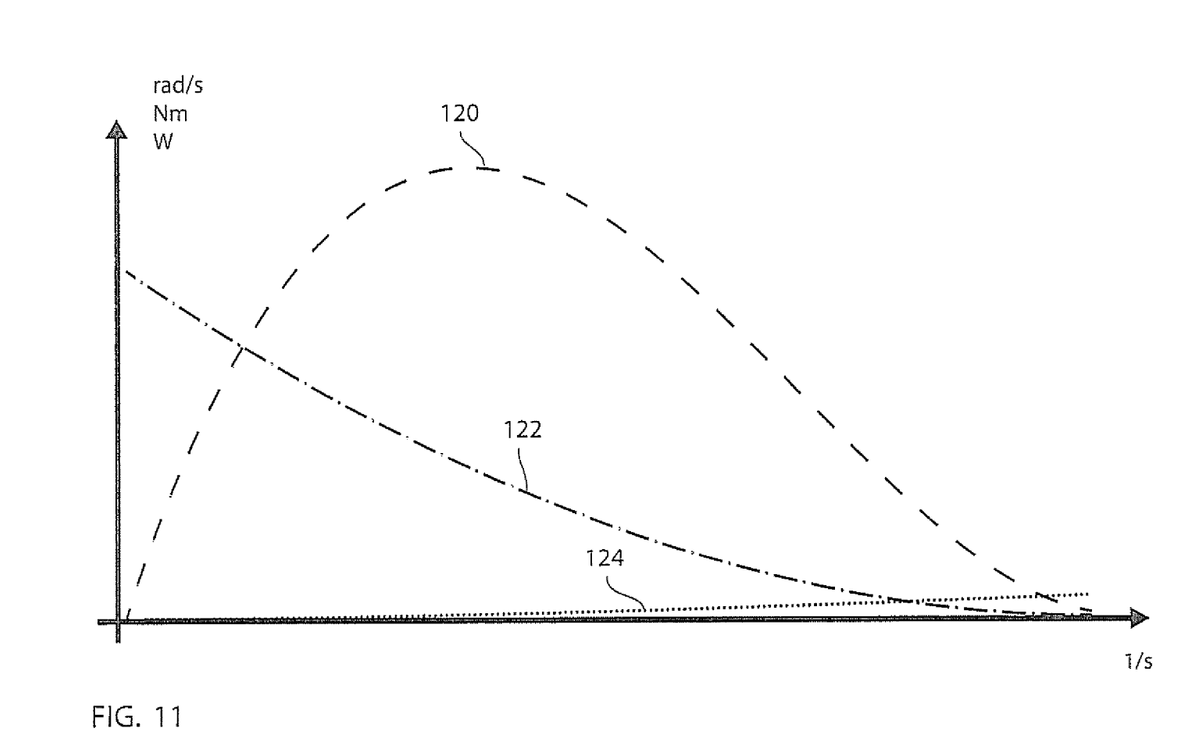
FIG. 11 illustrates a graph showing the performance of a water-mill according to the preferred embodiment of the present invention.

FIG. 11 shows graph illustrating a typical performance of a water-mill according to the preferred embodiment of the present invention. The abscissa represents the number of revolutions per second in units of reciprocal seconds ($s^{-1}$), the first curve 120 represents the output electrical power from the waste-watermill in the units of Watt (W), the second curve 122 moment on the axle in units of Newton meter (Nm), and the third curve 124 represents the rotational speed of the axle in the units of radians per second (rad/s).

Estimates of the potential electrical power output have been made for waste-watermill as described in relation to FIGS. 1A-B, with the corresponding relative dimensions of the components of the waste-watermill and the waste-water conduit. In a first estimate the waste-water conduit was assumed to have an inner diameter of 800 mm. With a depth of the waste water of 400 mm at the centre of the waste-water conduit and at a typical material and slope of the waste-water conduit, the output electrical power is comparable to that of a small windmill. In a first estimate the waste-water conduit was assumed to have an inner diameter of 3000 mm. With a depth of the waste water of 1500 mm at the centre of the waste-water conduit and at a typical material and slope of the waste-water conduit, the output electrical power is comparable to that of a large windmill. However, the total amount of energy produced may be significantly greater for the waste-watermills, since the water level defined in the estimates may be typical for about 75 to 80% of the time, while wind turbines typically work at optimum level about 30% of the time.

It is contemplated that the watermill will cause the pressure to be reduced above the water wheel, which may function to prevent the water level from reaching the top of the waste-water conduit if the watermill is located below a manhole or the like that allows air to enter the waste-water conduit.

Points Characterising the Invention:

1. A waste-watermill for generating electrical energy from a flow of waste water running through an underground waste-water conduit, said flow of waste water defining a free surface and a flow direction inside said waste water conduit, said waste-watermill comprising:
   a water wheel for being driven by said flow of waste water in an undershot configuration,
   an axle for defining an rotational axis for said water wheel, said flow of waste water passing below and transverse to said rotational axis in said undershot configuration,
   a wheel support for rotationally supporting said water wheel in said undershot configuration and in a stationary position relative to said underground waste-water conduit, and
   an electric generator operatively connected with said water wheel and said axle for being driven by said water wheel to produce electrical energy.

2. The waste-watermill according to point 1 wherein said flow of waste water passes perpendicularly to said rotational axis in said undershot configuration.

3. A waste-watermill for generating electrical energy from a flow of waste water running through an underground waste-water conduit, said flow of waste water defining a free surface and a flow direction inside said waste water conduit, said waste-watermill comprising:
   a water wheel for being driven by said flow of waste water in an undershot configuration,
   an axle for defining an rotational axis for said water wheel, said rotational axis being positioned above said free surface and oriented transverse to said flow direction in said undershot configuration,
   a wheel support for rotationally supporting said water wheel in said undershot configuration and in a stationary position relative to said underground waste-water conduit, and
   an electric generator operatively connected with said water wheel and said axle for being driven by said water wheel to produce electrical energy.

4. The waste-watermill according to point 3 wherein said rotational axis is perpendicular to said flow direction.

5. The waste-watermill according to any of the points 1 to 4 wherein said underground waste-water conduit defines an inner surface and said wheel support comprises a fastener for securing said wheel support to said inside surface.

6. The waste-watermill according to point 5 wherein said underground waste-water conduit defines an inner surface comprising a side portion positioned between the bottom and the top of said underground waste-water conduit, and said fastener is adapted for securing said wheel support to said side portion.

7. The waste-watermill according to any of the points 1 to 6 wherein said fastener is adapted for securing said wheel support to a concrete and/or to a plastic structure.

8. The waste-watermill according to any of the points 1 to 7 wherein said water wheel comprises a paddle for being pushed by said flow of waste water to drive said water wheel.

9. The waste-watermill according to point 8 wherein said paddle extends in a radial direction relative to said rotational axis.

10. The waste-watermill according to any of the points 8 to 9 wherein said water wheel comprises a paddle support interconnecting said paddle and said axle for supporting said paddle.

11. The waste-watermill according to point 10 wherein said paddle is releasably attached to said paddle support.

12. The waste-watermill according to any of the points 10 to 11 wherein said paddle support is composed of a number of smaller elements for enabling an in situ assembling of said central portion.

13. The waste-watermill according to any of the points 10 to 12 wherein said paddle support is a cylinder and the symmetry axis of the cylinder is collinear with said rotational axis.

14. The waste-watermill according to point 13 wherein said cylinder is a circular cylinder.

15. The waste-watermill according to any of the points 10 to 14 wherein said paddle support has a first maximum extension perpendicular to said rotational axis and a second maximum extension parallel to said rotational axis, and said first maximum extension is greater than said second maximum extension.

16. The waste-watermill according to point 15 wherein said first maximum extension is greater than said second maximum extension by a factor in one or more of the ranges 2 to 20, 3 to 10, 4 to 9, 5 to 8, 6 to 7, 2 to 3, 3 to 4, 4 to 5, 5 to 6, 6 to 7, 7 to 8, 8 to 9, 9 to 10, and 10 to 20.

17. The waste-watermill according to any of the points 10 to 16 wherein said paddle support is a hollow and airtight body.

18. The waste-watermill according to any of the points 1 to 17 wherein said water wheel comprises said axle, said water wheel is fixed to said axle, said wheel support rotationally supports said axle, and said electric generator is operatively connected with said water wheel via said axle.

19. The waste-watermill according to any of the points 1 to 17 wherein said wheel support comprises said axle, said axle is fixed to said wheel support, said axle rotationally supports said water wheel, and said electric generator is a hub generator attached to said water wheel and said axle.

20. The waste-watermill according to point 19 wherein said electric generator is positioned within said paddle support.

21. The waste-watermill according to any of the points 8 to 20 wherein said paddle is curved to define a convex side and a concave side opposite from said convex side.

22. The waste-watermill according to point 21 wherein said paddle defines a portion of a cylindrical surface, and said paddle extends parallel to the symmetry axis of the cylindrical surface.

23. The waste-watermill according to point 22 wherein the cross-section of said paddle is perpendicular to said radial direction and corresponds to an arc of a circle.

24. The waste-watermill according to any of the points 8 to 23 wherein said paddle has a proximal point located at said paddle support and a distal point located at the outmost end of the paddle from the rotational axis, and the cross-section of said paddle perpendicular to said radial direction has approximately the same curvature at all points between said proximal and distal point.

25. The waste-watermill according to point 24 wherein the cross-section of said paddle parallel to said radial direction has a curvature that is approximately zero.

26. The waste-watermill according to any of the points 8 to 25 wherein said paddle extends from said paddle support in a direction defining an angle to said radial direction.

27. The waste-watermill according to any of the points 8 to 26 wherein said paddle comprises a narrow portion and a wide portion, said narrow portion being located closer to said rotational axis than said wide portion, said narrow portion has a third maximum extension parallel to said rotational axis, said wide portion has a fourth maximum extension parallel to said rotational axis, and said third maximum extension is smaller than said fourth maximum extension.

28. The waste-watermill according to any of the points 8 to 27 wherein said paddle defines a paddle profile when viewed in a direction perpendicular to said radial direction and said rotation axis, and said paddle profile has a curved distal edge.

29. The waste-watermill according to point 28 wherein said curved distal edge corresponds to a portion of a circle.

30. The waste-watermill according to point 28 wherein said curved distal edge defines a rounded protuberance.

31. The waste-watermill according to any of the points 8 to 30 wherein said paddle defines a paddle profile when viewed in a direction perpendicular to said radial direction and said rotation axis, and said paddle profile has a curved distal edge corresponding to the bottom portion of the cross-sectional cut of said waste-water conduit.

32. The waste-watermill according to any of the points 8 to 31 wherein said water wheel comprises a plurality of additional paddles similar to said paddle.

33. The waste-watermill according to any of the points 1 to 32 wherein said a wheel support is adapted for positioning said water wheel such that said rotational axis is located above the top of said waste-water conduit in said undershot configuration.

34. The waste-watermill according to any of the points 1 to 33 wherein said wheel support is adapted for positioning said water wheel such that said rotational axis is located below the top of said waste-water conduit and closer to the top of said waste-water conduit than to the bottom of said waste-water conduit.

35. The waste-watermill according to any of the points 1 to 34 wherein said waste-water conduit defines a first height corresponding to the average inner vertical dimension of said waste-water conduit, said wheel support is adapted for positioning said water wheel such that said rotational axis is located at a second height relative to the bottom of said waste-water conduit, and the ratio of said second height over said first height is in one or more of the ranges 0.5 to 0.6, 0.6 to 0.7, 0.7 to 0.8, 0.8 to 0.9, and 0.9 to 1.0, and/or in one or more of the ranges 0.7 to 0.8, 0.6 to 0.9, and 0.5 to 1.

36. The waste-watermill according to any of the points 1 to 35 wherein said generator is located at a first elevation from the bottom of said waste-water conduit and said rotational axis is located at a second elevation from the bottom of said waste-water conduit, and said first and second elevations are approximately equal or said first elevation is greater than said second elevation.

37. The waste-watermill according to any of the points 1 to 36 wherein said generator is located above the top of said waste-water conduit.

38. The waste-watermill according to any of the points 1 to 37 wherein said underground waste-water conduit is connected with an underground passageway, and said waste-watermill further comprises:
  a watertight partition for sealing off said underground passageway from said waste-water conduit for preventing waste water to flow into said underground passageway, said watertight partition defining an aperture allowing said wheel axle to pass through said watertight partition, and said electric generator being adapted to be positioned on the side of said partition that is opposite from the side on which said water wheel is positioned.

39. The waste-watermill according to point 38 wherein said electric generator is attached to and supported by said partition.

40. The waste-watermill according to any of the points 38 to 39 wherein said waste-watermill further comprises:
  a seal for preventing waste water of said flow of waste water to flow between said watertight partition and said wheel axle.

41. The waste-watermill according to any of the points 38 to 40 wherein a first portion of said the wheel support is attached to said watertight partition, and a second portion of said wheel support wheel support is adapted for being attached to and supported by said waste-water conduit on the opposite side of said water wheel from said watertight partition.

42. The waste-watermill according to any of the points 1 to 41 wherein said waste-watermill further comprises:
  a door attached to said waste-water conduit for closing off said waste water conduit to reduce or stop said flow of waste water running past said water wheel.

43. The waste-watermill according to point 42 wherein said door is located upstream from said water wheel relative to said flow of waste water.

44. The waste-watermill according to point 43 wherein said waste-watermill further comprises:
  a bypass conduit connecting to said waste-water conduit at a first point upstream from said water wheel and at a second point downstream from said water wheel, for allowing said flow of waste water to circumvent said water wheel.

45. The waste-watermill according to point 44 wherein said door is located downstream from said first point relative to said flow of waste water.

46. The waste-watermill according to any of the points 1 to 45 wherein said waste-watermill further comprises:
  a shield for being inserted upstream from said water wheel relative to said flow of waste water, and
  a shield actuator for moving said shield between a retracted state and inserted state, said shield diverting at least some of said flow of waste water away from said water wheel in said inserted state, and diverting less or none of said waste water away from said water wheel in said retracted state as compared to said inserted state.

47. The waste-watermill according to point 46 wherein said shield comprises:
  a casing defining an inner space for accommodating a portion of or the whole of said water wheel in said inserted state, and said shield actuator comprising:
    a guide rail for supporting said casing relative to said waste-water conduit and for allowing said casing to move between said retracted and inserted states.

48 The waste-watermill according to point 46 wherein said waste-watermill further comprises:
  an upper casing defining a first arc of a cylinder having a first inner space for accommodating a corresponding arc of said water wheel, and said shield comprising, said shield comprises:
  a lower casing defining a first arc of a cylinder having a second inner space for accommodating a corresponding arc of said water wheel,
  said upper casing being adapted for accommodating a portion of or the whole of said lower casing, or said lower casing being adapted for accommodating a portion of or the whole of said upper casing, and
  said shield actuator comprising:
    a rotational support for rotationally connecting said lower casing to said axle for allowing said lower casing to rotate between said retracted and inserted states.

49. The waste-watermill according to point 48 wherein said upper and lower casings may be adapted for completely covering said water wheel with said lower casing in said shield in said inserted state.

50, A method for generating electrical energy from a flow of waste water running through an underground waste-water conduit of an underground sewer structure, said flow of waste water defining a free surface and a flow direction inside said waste water conduit, said method comprising:
  providing a water wheel for being driven by said flow of waste water in an undershot configuration,
  providing an axle for defining a rotational axis for said water wheel,
  positioning said rotational axis above said free surface,
  orienting said axle transverse to said flow direction,
  providing a wheel support for rotationally supporting said water wheel in a stationary position relative to said underground waste-water conduit,
  securing said wheel support to said underground sewer structure for supporting said water wheel in said undershot configuration, and
  providing an electric generator for producing electrical energy,
  operatively connecting said generator with said water wheel for driving said electric generator by said water wheel.

51. The method according to point 50 wherein said water wheel, said axle, said wheel support, and said electric generator constitute a waste-watermill, and said waste-watermill further comprises any of the features according to any of the points 1 to 49.

The invention claimed is:
1. A waste-watermill for generating electrical energy from a flow of waste water running through an underground waste water conduit having a top and a bottom, said waste water conduit being connected to an underground passageway and having an inner diameter, said flow of waste water defining a free water surface below the top of said waste water conduit and having a flow direction through said waste water conduit, said waste-watermill comprising:
  a water wheel fixed to an axle defining a rotational axis for said water wheel, said rotational axis being defined above said free surface and transverse to said flow direction, whereby said water wheel is positioned relative to said waste water conduit so as to be rotated by said flow of waste water in an undershot configuration;

a wheel support rotationally supporting said axle, whereby said rotational axis is located below the top of said waste water conduit and closer to the top of said waste water conduit than to the bottom of said waste water conduit;

a watertight partition separating said waste water conduit from said underground passageway, said watertight partition defining a first side on which said water wheel is located, and an opposite second side, and an aperture having a seal through which a first end of said axle passes; and an electric generator in said passageway on said second side of said watertight partition and operatively connected to said first end of said axle so as to be driven by said water wheel to produce electrical energy;

wherein said water wheel comprises a plurality of paddles connected to said axle by a paddle support disposed coaxially around said axle and having a cylindrical surface, each of said paddles extending radially from said cylindrical surface of said paddle support to a distal edge, said paddles being positioned and configured so as to be pushed by said flow of waste water to rotate said water wheel.

2. The waste-watermill of claim 1, wherein said paddle support has a first maximum extension perpendicular to said rotational axis and a second maximum extension parallel to said rotational axis, said first maximum extension being greater than said second maximum extension.

3. The waste-watermill of claim 1, wherein said water wheel is fixed to said axle, said wheel support rotationally supports said axle, and said electric generator is operatively connected with said water wheel via said axle.

4. The waste-watermill of claim 1, wherein each of said paddles defines a concave surface facing said flow of waste water.

5. The waste-watermill of claim 1, wherein each of said paddles comprises a narrow portion and a wide portion, said narrow portion being located closer to said rotational axis than said wide portion.

6. The waste-watermill of claim 1, wherein said generator is located at a first elevation from the bottom of said waste-water conduit, and said rotational axis is located at a second elevation from the bottom of said waste water conduit, said first elevation being at least equal to said second elevation.

7. The waster-watermill of claim 1, wherein said bottom of said conduit is defined by a wall surface having a curvature in cross-section, and wherein said distal edge has a curvature corresponding to the curvature of said wall defining said bottom of said waste water conduit.

8. The waste-watermill of claim 1, wherein said paddle support is configured as a hollow, airtight cylinder having an axis collinear with said axle.

9. A method for generating electrical energy from a flow of water running through an underground water conduit in an underground sewer structure, said water conduit being separated from an underground passageway by a watertight partition having opposite first and second sides and a sealed aperture therethrough, said water conduit having an inner diameter and a top and a bottom, said flow of water defining a free water surface below the top of said water conduit and having a flow direction through said water conduit, said method comprising:

(a) securing to said underground sewer structure on said first side of said watertight partition a water wheel operable for being driven by said flow of water, the water wheel having an axle defining a rotational axis for said water wheel, said axle having a first end passing through said sealed aperture in said watertight partition, said rotational axis being defined above said free surface and transverse to said flow direction, wherein said water wheel is rotationally supported relative to said water conduit such that said rotational axis is located below the top of said water conduit and closer to the top of said water conduit than to the bottom of said water conduit, wherein said water wheel includes a paddle support disposed coaxially around said axle, said paddle support having a cylindrical surface;

(b) attaching to said paddle support in situ a plurality of paddles, each of said paddles extending radially from said cylindrical surface of said paddle support to a distal edge, each of said paddles being configured for being pushed by said flow of water to drive said water wheel; and (c) positioning an electrical generator in said passageway on said second side of said watertight partition and operatively connecting said first end of said axle to said electrical generator for driving said electric generator by the rotation of said water wheel.

10. The method of claim 9, wherein said bottom of said water conduit is defined by a wall surface having a curvature, and wherein each of said paddles has a distal edge with a curvature conforming to the curvature of said bottom of said water conduit.

* * * * *